O. MOESSNER.
ELECTRIC SWITCH AND OUTLET BOX.
APPLICATION FILED MAY 25, 1912.
1,057,258.
Patented Mar. 25, 1913.
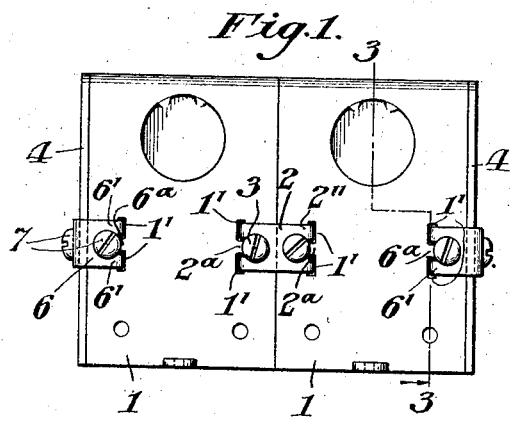
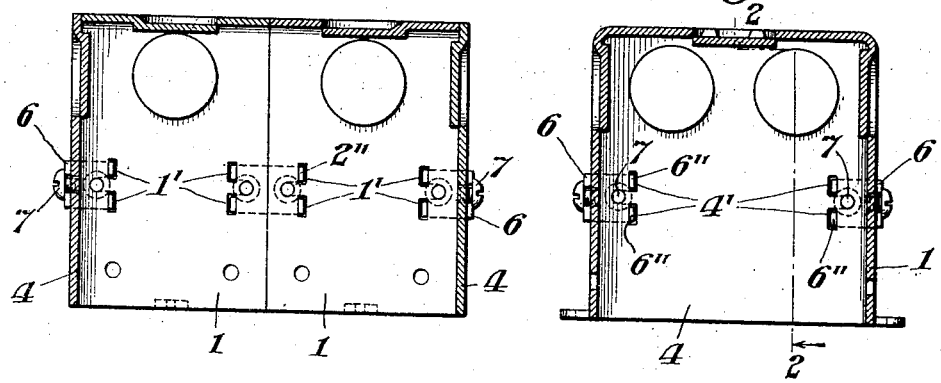
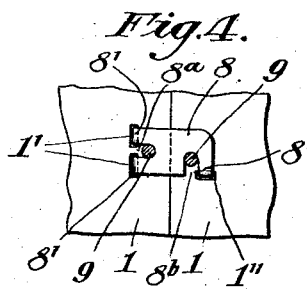
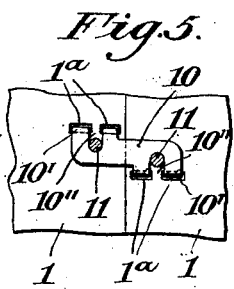
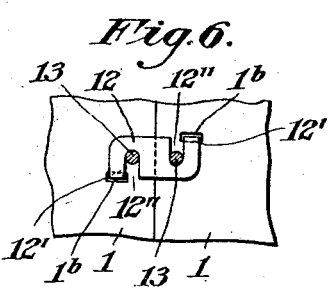
WITNESSES
INVENTOR
Otto Moessner
BY Charles N. Butler
ATTORNEY

UNITED STATES PATENT OFFICE.

OTTO MOESSNER, OF PHILADELPHIA, PENNSYLVANIA.

ELECTRIC SWITCH AND OUTLET BOX.

1,057,258.  Specification of Letters Patent.   Patented Mar. 25, 1913.

Application filed May 25, 1912.  Serial No. 699,755.

*To all whom it may concern:*

Be it known that I, OTTO MOESSNER, a citizen of the United States, residing in the city of Philadelphia, county of Philadelphia, and State of Pennsylvania, have invented certain Improvements in Electric Switch and Outlet Boxes, of which the following is a specification.

My invention is more particularly a sectional box adapted for holding electric switches and passing the lead wires therefor, and its primary object is the provision of a standard form of section that can be used conveniently in extending the size of such boxes, a standard form of end of simple construction with which either side of a box section is adapted to be combined, and simple means for securing the parts together in firm relation.

In the accompanying drawings, Figure 1 is a side elevation of a box comprising two sections embodying my invention; Fig. 2 is a sectional view taken on the line 2—2 of Fig. 3; Fig. 3 is a sectional view taken on the line 3—3 of Fig. 1; and Figs. 4, 5, and 6 illustrate modified forms of devices for fixing the sections together.

The box illustrated in Figs. 1, 2, and 3 comprises substantially U-shaped sections 1 of similar construction. Each of the parallel legs of each U-shaped section is provided with apertures 1′ symmetrically disposed with relation to the edges of such legs. The sections are fixed together by clips 2 having slots 2$^a$ therein forming end bifurcations 2′ with claws 2″ bent at right angles to the bodies thereof, the claws being inserted through the respective apertures 1′ and the clips held in place by screws 3 passing through the slots into the box sections, which are thus firmly bound together so that they can neither slide relatively to each other nor separate.

Ends 4 are provided with two sets of apertures 4′, each set being disposed symmetrically with reference to the edges of the end and in planes passing through corresponding apertures 1′. These ends are adapted to be fitted against either edge of any box section to which they are engaged by angular clips 6 having therein slots 6$^a$ forming bifurcations 6′ with claws 6″ thereon which are engaged in corresponding apertures 1′ and 4′, the clips being held in place by screws 7 passing through the slots into the respective side and end sections, which are thus secured against separation or sliding relatively to each other.

The clips may be modified as illustrated in Fig. 4 in which adjacent sections 1 are provided with the respective apertures 1′ and 1″ and the clip 8 is provided at one end with two claws 8′ engaging the apertures 1′ and at the other end with the single claw 8″ engaging the aperture 1″, the opposite ends of the clip having therein the transversely extending slots 8$^a$ and 8$^b$ through which screws 9 are passed into the box sections.

As illustrated in Fig. 5, the sections 1 are each provided with two apertures 1$^a$ adjacent to their engaging edges and the clip 10 is provided with claws 10′ extending into these apertures and with oppositely extending slots 10″ through which screws 11 are passed into the sections 1 to hold them against separation or movement relatively to each other.

As illustrated in Fig. 6, the sections 1 are provided with the single apertures 1$^b$ adjacent their engaging edges and the clip 12 is provided with the single end claws 12′ extending into these apertures and with the oppositely extending slots 12″ through which screws 13 are passed into the box sections to hold them against separation or relative movement.

It will be understood from the foregoing description that the elements used in my improvements can be formed by simple operations without waste of material; that the sections are of such character that they can be reversed relatively to each other, either side of any U-shaped section being adapted to be engaged to any other such section or to an end, so that the parts can be assembled with facility; and the connections by which the parts are secured together are simple as well as efficient.

Having described my invention, I claim:

1. An outlet box comprising substantially U-shaped sections having similar abutting edges and detachable clips having claws engaging said sections to hold them together.

2. An outlet box comprising a substantially U-shaped section having apertures therein, in combination with an end having apertures therein, an angular clip having claws engaged in said apertures, and means for fixing said clip in engagement with said section and end.

3. An outlet box comprising a substantially U-shaped section having apertures therein, an end having apertures therein, said section having similarly formed opposite ends or sides and said end fitting either of the same, an angular clip having claws engaged in said apertures, and screws passing through said clip into said section and end.

4. An outlet box comprising several abutting sections each reversible with reference to the other, said sections having apertures adjacent to their abutting edges, and clips having claws whereby said sections are held together.

5. An outlet box comprising several abutting sections containing apertures adjacent to their abutting edges, clips having claws engaging said apertures, said clips having slots in the ends thereof, and screws passing through said slots into said sections whereby said clips are fixed.

6. An outlet box comprising a substantially U-shaped section having at its opposite open ends similar parallel edges with apertures adjacent thereto, a cover adapted for engagement with the edges of said opposite ends, said cover having apertures therein, an angular clip having claws adapted for engagement in the apertures of said section and cover, said clip having slots therein, and screws passing through said slots into said section and cover whereby said clip is engaged in position.

7. An outlet box comprising abutting sections one of which has an aperture therein, and means comprising a clip whereby said sections are fastened together, said clip having a claw engaging said aperture.

In witness whereof I have hereunto set my name this 14th day of May, 1912, in the presence of the subscribing witnesses.

OTTO MOESSNER.

Witnesses:
  CHARLES N. BUTLER,
  JOS. G. DENNY, Jr.

---

Copies of this patent may be obtained for five cents each, by addressing the "Commissioner of Patents, Washington, D. C."